Sept. 12, 1950 N. F. CLAYBORNE 2,521,966
VALVE SEAT AND VALVE STEM GAUGING APPARATUS
Filed Jan. 11, 1945 2 Sheets-Sheet 2
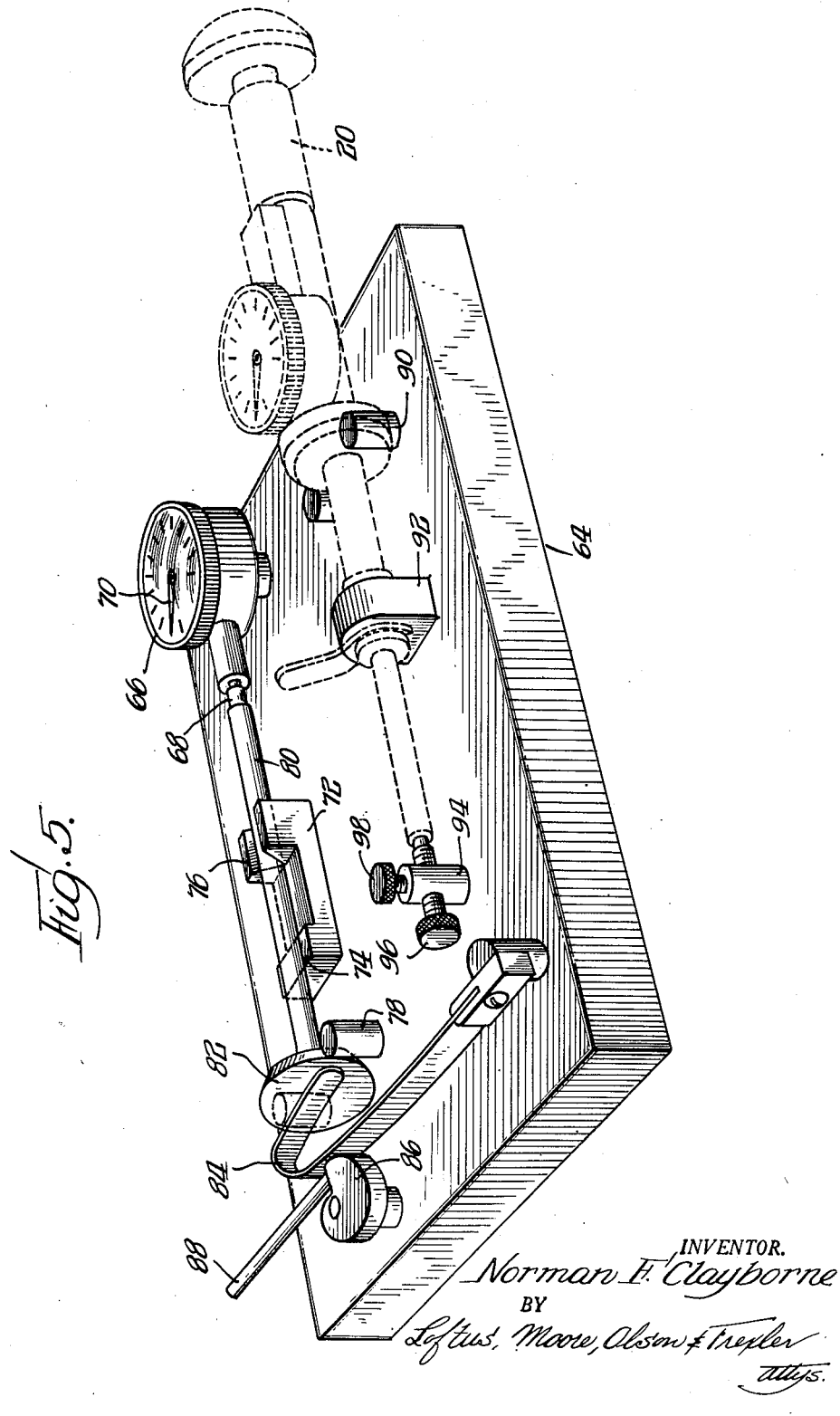
INVENTOR.
Norman F. Clayborne
BY
Loftus, Moore, Olson & Trexler
Attys.

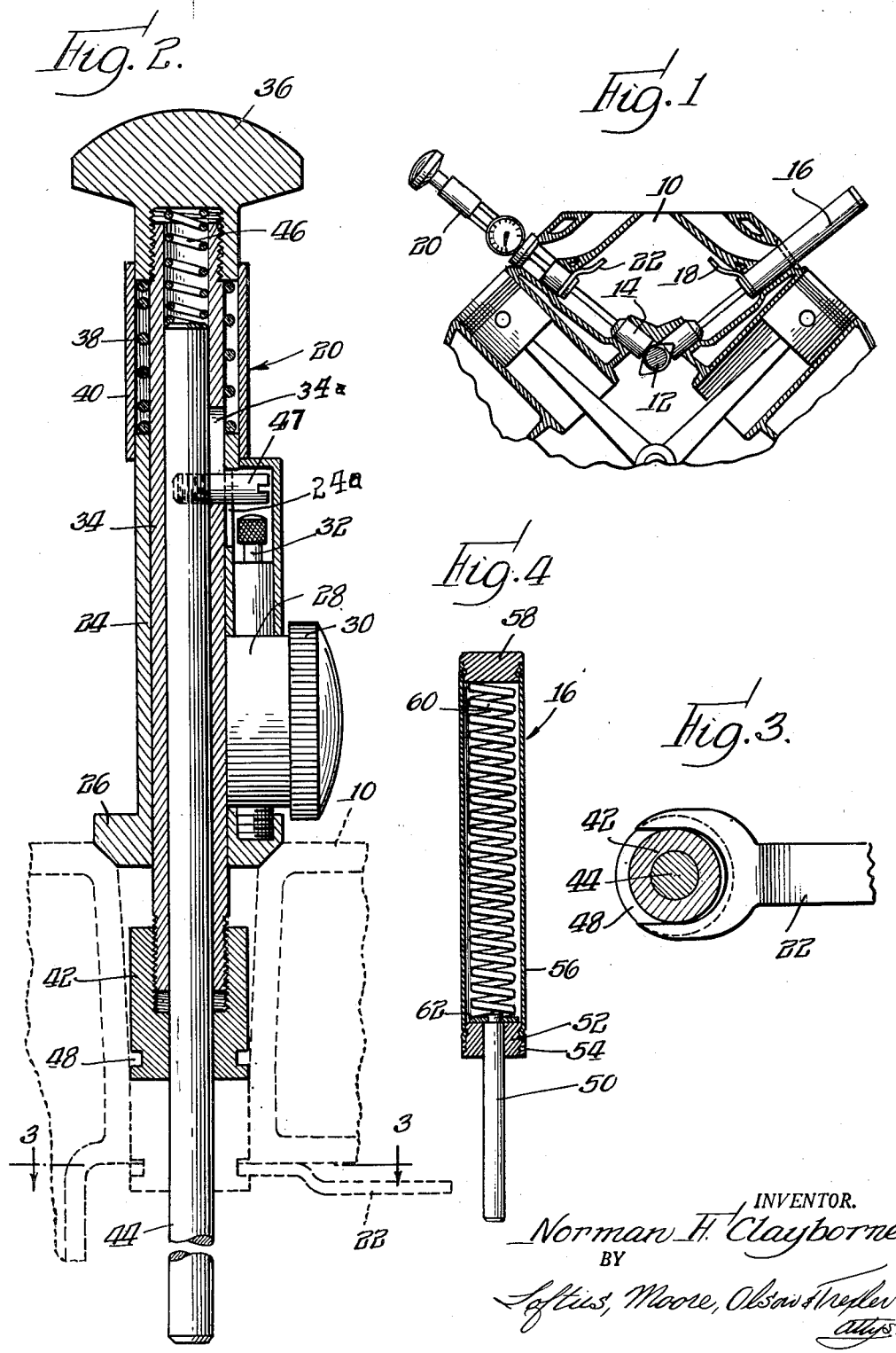

Patented Sept. 12, 1950

2,521,966

UNITED STATES PATENT OFFICE 2,521,966

VALVE SEAT AND VALVE STEM GAUGING APPARATUS

Norman F. Clayborne, Chicago, Ill.

Application January 11, 1945, Serial No. 572,306

6 Claims. (Cl. 33—181)

The present invention relates to a valve seat and valve stem gaging apparatus, the more particularly to such apparatus and the method of use thereof.

In the repair and reconditioning of automotive engines certain types of motors are provided with valve heads and stems which operate directly against valve lifters or cam followers. No means are provided for adjusting the relation between the cam follower and the valve stem other than grinding off a portion of the stem if the stem is of excessive length. In the reconditioning of such motors, which includes well-known V-8 motors, the common practice is to remove the valve springs and to grind the valve seats. Where necessary the valve seats and valve heads may first be refaced. Such operation lowers the valve seat with respect to the center line of the cam shaft and raises the seating surface on the valve head thereby to effectively lengthen the valve stem so that for proper operation the valve stem must be cut down in length. This operation is one which requires considerable skill and care so as to provide motor operation without valve noise. In order to facilitate proper reconditioning of a motor of this type there is provided in accordance with the present invention certain apparatus for accurately gaging the distance between the valve seat and the cam follower or the cam shaft so as to determine with accuracy the proper length of a valve stem and head to be used in conjunction with the particular valve seat.

In accordance with the present invention the individual valves after having been refaced or ground so as to recondition the seating surface may accurately be measured by a gaging apparatus. Other apparatus is also provided for properly biasing the valve lifters or cam followers and the cam shaft so as to obviate the error which might be introduced if slight clearance or an oil film has displaced the cam surfaces and the cam followers from the normal operating positions.

It, therefore, is an object of the present invention to provide an improved valve seat and valve stem gaging apparatus for the repair and reconditioning of automotive motors.

It is a further object of the present invention to provide an improved apparatus for gaging the parts involved in reconditioning of the valves of an automotive motor.

Other and further objects of the present invention subsequently will become apparent by reference to the following description taken in connection with the accompanying drawings wherein Figure 1 schematically illustrates the application of the present invention to the repair of an internal combustion motor;

Figure 2 is a cross sectional view of certain apparatus comprising the present invention;

Figure 3 is a view illustrating the manner in which the apparatus shown in Figure 2 is retained in position for a gaging operation;

Figure 4 illustrates a biasing tool for obviating the error which might be introduced in the cam shaft of the cam followers; and Figure 5 is a perspective view of a gaging and checking apparatus.

The present invention is directed to apparatus for reconditioning valves in an internal combustion motor. Figure 1 of the drawing shows a V-type motor 10 having a cam shaft 12 provided with suitable cam followers or valve lifters 14. In this figure the valve heads, stems and valve springs have been removed from the motor block. In order to place the cam shaft 12 and the cam followers 14 under sufficient bias to eliminate the error which might be introduced by normal clearance or by an oil film, each side of the motor block adjacent the particular cylinder upon which a gaging operation is to be performed is provided with a bias tool 16 held in position by a clip 18. The biasing tool 16 occupies the space normally occupied by the valve guide, and valve stem and head. Thus when viewed from the left side of Figure 1, the member 16 may be positioned on the opposite side of the motor block to the left of a gaging tool 20 mounted in the near side of the motor block. To the right of the gaging tool on the near side another tool 16 not shown is also mounted so that the two tools 16 apply the proper pressure to bias the cam shaft 12 in a direction to which it is normally biased when the valves and valve springs are in position. The tool 20 is retained in engaging position by a clip 22. The clip 22 is similar to the clip 18.

The gaging tool 20 is shown in Figure 2 as having a body portion 24 formed adjacent its lower end with a valve seat engaging portion 26. Mounted on the body portion 24 is a plunger actuated micrometer gage 28. The gage 28 is of a type well-known in the art which has a cover with a milled edge rim 30. By adjustment of the rim of the cover 30 the zero position of the pointer of the gage 28 may be adjusted. The gage 28 has a plunger or rod 32 which when moved produces movement of the indicator hand. Mounted within the body 24 is a sleeve 34 which at its upper end is threadedly engaged by a handle 36. A spring 38 is positioned between the upper end of the body 24 and the under surface of the handle 36. A suitable enclosing sleeve or cylinder 40 is provided to enclose the spring 38. The other end of the sleeve 34 is threadedly secured to a guide 42 which is adapted to replace the valve guide in a motor during the gaging operation. The guide 42 together with the inner bore of the sleeve 34 supports a rod 44 which is adapted to engage the valve lifter or cam follower 14. Between the handle 36 and the upper end of the rod 44 there is positioned a biasing spring 46 to urge the rod 44 downwardly. At an intermediate point on the rod 44 there is provided a stud 47 arranged to extend outwardly through registering slots 24a, 34a in the housing and the sleeve, respectively, and to engage the rod 32 of the micrometer gage of the micrometer 28.

The gaging tool 20 shown in Figure 2 is placed in position in the motor block 10, shown in dotted lines in Figure 2, by having the body portion 26 engage the valve seat. Thereupon pressure is applied to the handle 36 so as to compress the spring 38 and to move the sleeve 34 down sufficiently that the keeper member 22 may be inserted in an annular slot 48 in the guide member 42 thereby to retain in position the gaging apparatus 20. The action of the spring 38 therefore insures rigid positioning of the gaging device and the application of a predetermined amount of pressure to the valve seat by the body portion 26. By providing a certain amount of pressure against the valve seat of the motor block by the action of the spring 38, the possibility of various errors is obviated. To further illustrate the manner in which the key or keeper 22 engages the annular recess 48 of the guide 42, reference may be had to Figure 3 which is partially in cross section as might be seen in the direction of the arrows along the line 3—3 of Figure 2.

The biasing tool 16 which applies a certain spring pressure to the cam shaft 12 is shown in cross section in Figure 4. The tool 16 has a rod 50 reciprocably mounted in a lower body portion 52 which is provided with an annular recess 54 adapted to receive the keeper or clip 18. Extending upwardly from the lower body portion 52 is a cylindrical casing 56 which is closed at its top by a top body portion 58. Within the cylindrical housing 56 there is a coiled spring 60 acting between the top 58 and the top end of the rod 52 which may be provided with an enlarged portion or a washer 62 so as to be engaged by the spring 60. The tool 16 therefore is inserted in the valve opening of a motor block and by adequate pressure on the end thereof the cylindrical portion 56 is moved downwardly sufficiently so that the annular recess 54 may be engaged by a retaining keeper 18.

In order to check the accuracy of the gaging tool 20 shown in Figure 2, and to measure the effective length of ground or resurfaced valve heads and stems, there is provided a gaging apparatus shown in Figure 5. This apparatus has a base 64 which carries a plunger actuated micrometer 66. The micrometer 66 is provided with a plunger actuator 68 and with a pointer and dial 70. A guide block 72 of suitable configuration such as that shown which may have a flat portion 74 and a V-notch portion 76 is provided retaining the valve stem of a valve in position for a gaging operation so that the end of the valve stem will properly engage the plunger 68 of the micrometer 66. A pair of cylindrical studs 78 are positioned in spaced apart relation just beyond the block 72 so as to correspond to the valve seat in a motor or in other words to provide surfaces for engagement with the seating surface on a valve head. In the figure there is shown a valve stem 80 and valve head 82 positioned between the cylindrical studs 78 and resting on the block 72 so as to engage the plunger 68 of the micrometer 66. In order that the valve might be retained in proper position with the proper degree of pressure, there is provided a spring 84 which may be in the form of a reversely bent spring. The spring 84 is deflected by a cam 86 which may be actuated by a suitable handle 88.

Also mounted on the base 64 are a pair of cylindrical studs 90 positioned in a manner similar to the studs 78. Along a line mid-way between the studs 90, there is positioned a block 92 having an opening generally corresponding to the opening in a motor block in which a valve stem guide is mounted. Beyond the block 92 is a post 94 having a transversely arranged threaded screw stop member 96. The stop member 96 may be locked in position by a thumb screw 98.

The purpose of the present invention can perhaps be best understood by describing the sequence of operations required for reconditioning, resurfacing, or regrinding valves. In order to grind the valves of a motor, the valve springs are removed and usually a spring is inserted between the valve stem guide and the underside of the valve head. Thereupon a valve grinding tool is used to grind the valve in position after the valve seat has been supplied with valve grinding compound. As each valve is being ground the cam shaft 12 is turned so that the cam follower 14 adequately clears the end of the valve stem. After all of the valves have been ground, it then becomes necessary to provide for the proper adjustment of the valves. In order to bias the cam shaft 12 toward its normal operating position, a valve spring pressure tool or biasing tool 16 is inserted on opposite sides of the motor or opposite sides of the cylinder in which valves are to be installed. The members 16 therefore are retained in position by the keepers 18. The gaging tool 20 must first be checked before it can be properly used and for this purpose the device shown in Figure 5 is utilized in a manner presently to be described.

After all of the valves have been ground, a master or gaging valve comprising a valve stem and valve head is placed in position as shown in Figure 5. Such valve generally has thereon a reference number corresponding to certain indicia on the dial of the micrometer gage 66. A valve therefore is inserted in the position shown and the milled edge rim of the micrometer 66 is then adjusted so that the indicator hand 70 points to a number on the dial corresponding to the number on a standard reference valve 80.

Thereupon the cam 86 is actuated and the spring 84 is released so that the valve may be removed. Thereafter each of the valve stems and heads heretofore removed from the motor block and resurfaced is placed upon the block 72 and a reading is taken on the gage 66. The various valves are each marked with a corresponding reference number, and then segregated and placed in bins bearing the numbers read on the dial indicator 66.

Thereafter the master valve stem and valve head is positioned against the studs 90. In order to support the valve stem, a valve guide may be mounted in the block 92. With the head of the master valve held against the posts 90, the screw 96 is adjusted so as to just touch the end of the valve stem. Thereupon the thumb screw 98 is tightened. The master valve and valve guides are removed. The gaging tool 20 thereupon is inserted in the block 92 with the body portion 26 in engagement with the upright posts 90 as shown in the dotted line representation in Figure 5. A suitable keeper or retainer 22 is inserted in the annular slot 48. The reading on the dial of the micrometer 28 of the tool 20 therefore is made to coincide with the reference number of the standard valve for which the screw 96 was adjusted. The clearance between the cam followers or valve lifters and the end of the valve stem must then be taken care of by adjusting the rim 30 of the micrometer 28 so as to reduce the reading by a corresponding amount. If it is desired to establish twelve thousandths of an inch of valve clearance, twelve thousandths is the amount subtracted from the reading on the dial and the pointer is adjusted to the new reading. The tool 20 thereupon is in adjusted condition for insertion into each of the valve openings of the motor block 10 of Figure 1. In each valve opening of the motor block 10, the tool 20 is inserted and a record is made of the reading on the dial of the micrometer 28. Care should be taken to have the valve lifters properly squared, ground, and cleaned and to adjust the cam shaft to its proper position. Accordingly a reading taken under proper conditions may then be used to select a valve having a similar number, and it will be found that such valve then will have the proper amount of clearance. If toward the end of the process of replacing the valve members, it is found that no valve of proper number is obtainable, a new valve may be used or if the old valve is too long, its stem may be shortened and gaged by the use of the apparatus shown in Figure 5. When the valve stem has been shortened a proper amount so that the reading of the dial of the gage 66 of Figure 5 corresponds with the reading recorded from the gaging apparatus 20, the valve will be of proper dimensions to provide the proper degree of clearance. By following the foregoing mode of operation, there is obtained an accurate reliable reconditioning and replacement of the valves of an internal combustion motor of the type referred to.

While for the purpose of illustrating and describing the present invention, certain preferred embodiments of the apparatus have been shown in the drawing, it is to be understood that the invention is not to be limited thereby since obviously such variations in the components and in their arrangements may be made as may be commensurate with the spirit and scope of the invention set forth in the following claims.

This invention is hereby claimed as follows:

1. A valve gaging tool comprising a housing having a frusto-conical portion for engaging the valve seat of an internal combustion engine, a spring plunger actuated micrometer mounted on said housing, a sleeve mounted in said housing, a rod mounted in said sleeve for reciprocable movement, said housing and said sleeves having registering slots therethrough, said rod having a member mounted thereon and extending through said slots for engagement with said micrometer, spring means disposed within said sleeve and bearing against the inner end of said rod to hold the opposite end of said rod outwardly of said sleeve and to cause said member on said rod to actuate said micrometer.

2. A tool for gaging the proper length of valve for a valve seat in the block of an internal combustion engine comprising a frame having a frusto-conical portion for engaging the valve seat in an engine, a plunger actuated micrometer mounted on said frame, a sleeve mounted in said frame, a rod mounted within said sleeve, means interposed between said frame and said sleeve tending to bias said sleeve in one direction, means interposed between said rod and said sleeve tending to bias said rod in the opposite direction, a guide member mounted adjacent the lower portion of said sleeve for engaging the valve guide recess in the block of said engine, means on said member to facilitate the retention of said member in position in said engine block, and means mounted on said rod for engaging said micrometer.

3. A tool for gaging the proper length of valve for a valve seat in the block of an internal combustion engine comprising a housing having a seat engaging portion adapted to engage the valve seat, a sleeve reciprocable within said housing and having the inner end thereof extending through said seat engaging portion and adapted to be secured in the valve guide opening of the engine block, a rod reciprocable within said sleeve with the inner end thereof extending exteriorly of the said inner end of said sleeve, differential spring means operatively tending to urge said rod inwardly of the engine block and to urge said sleeve in the opposite direction, a micrometer mounted on said housing, and means carried by said rod for actuating said micrometer.

4. A tool as claimed in claim 3, wherein the inner end of said sleeve carries a guide member having means thereon to facilitate retention thereof in the valve guide opening.

5. A tool as claimed in claim 3, wherein said differential spring means includes separate coil spring elements, one interposed between said sleeve and said housing and another interposed between said sleeve and said rod.

6. A tool as claimed in claim 3, wherein the sleeve and housing have registering slots therethrough and the means for actuating said micrometer consists of an arm extending laterally from said rod and through the registering slots in said sleeve and said housing.

NORMAN F. CLAYBORNE.

REFERENCES CITED

The following references are of record in the file of this patent:

UNITED STATES PATENTS

| Number | Name | Date |
| --- | --- | --- |
| 1,329,456 | Carpenter | Feb. 3, 1920 |
| 1,611,062 | Peebles | Dec. 14, 1926 |
| 1,927,821 | Abbott | Sept. 26, 1933 |
| 2,104,234 | Linne | Jan. 4, 1938 |
| 2,105,502 | Pointer | Jan. 18, 1938 |
| 2,306,489 | Mortensen | Dec. 29, 1942 |
| 2,323,508 | Acker | July 6, 1943 |
| 2,357,437 | Tilton | Sept. 5, 1944 |